United States Patent [19]

Gardner

[11] 3,977,299

[45] Aug. 31, 1976

[54] FASTENING MEANS FOR CLOSING A SERVOMOTOR

[75] Inventor: Delbert J. Gardner, South Bend, Ind.

[73] Assignee: The Bendix Corporation, South Bend, Ind.

[22] Filed: Nov. 25, 1974

[21] Appl. No.: 526,484

[52] U.S. Cl. .............................. 91/376 R; 92/98 D; 220/85 B; 220/315
[51] Int. Cl.² ...................... F15B 9/10; F01B 19/00; F16J 3/02
[58] Field of Search .................. 220/85 B, 309, 310, 220/315, 362; 91/369 A, 369 B, 369 R, 376 R; 92/98 D

[56] References Cited
UNITED STATES PATENTS

| 1,514,930 | 11/1924 | Reynolds | 220/309 |
|---|---|---|---|
| 3,045,652 | 7/1962 | Moyer | 91/376 |
| 3,312,147 | 4/1969 | Reichard | 91/369 A |
| 3,316,816 | 5/1967 | Yardley | 91/376 |

*Primary Examiner*—Paul E. Maslousky
*Attorney, Agent, or Firm*—Leo H. McCormick, Jr.; William N. Antonis

[57] ABSTRACT

A servomotor having a front shell with an annular wall in which an annular groove is located adjacent to an open end thereof. A rear shell has a peripheral ledge with radial lugs which are aligned in slots on the annular wall of the front shell. A diaphragm secured to a hub, which can move within the annular wall, has a bead with a contour which matches the annular wall from the annular groove to the slots. The peripheral ledge on the rear shell engages and compresses the bead of the diaphragm against the annular wall and groove of the front shell to separate a front chamber from a rear chamber when tabs on the open end of the annular wall lock the lugs against the slots.

1 Claim, 4 Drawing Figures

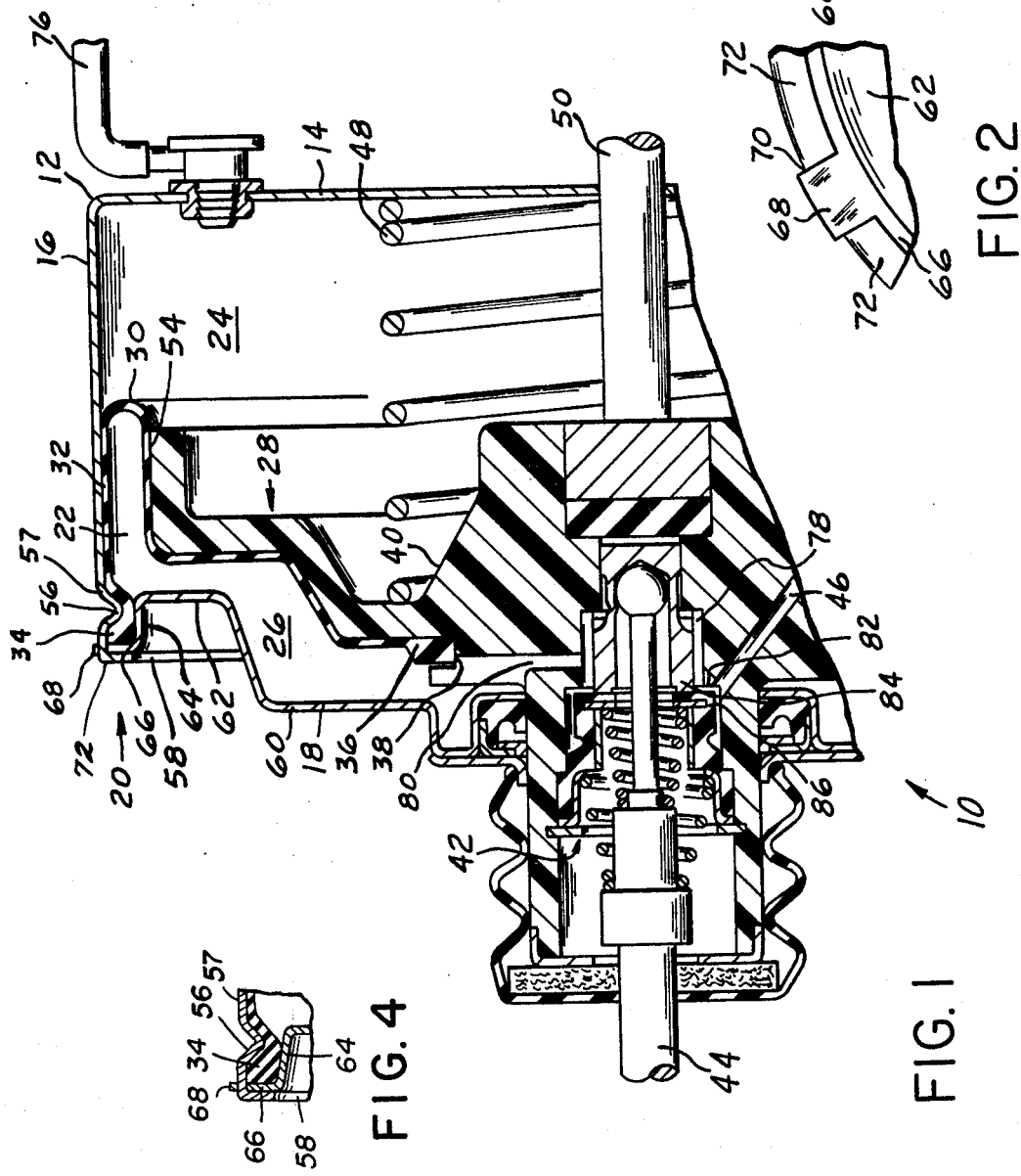

FASTENING MEANS FOR CLOSING A SERVOMOTOR

BACKGROUND OF THE INVENTION

The available space under the hood of recently manufactured automobiles has been continually decreasing due to both the added accessories and required safety and pollution devices.

In automobiles equipped with one type of power brakes, a servomotor is required to provide an output force needed to operate the master cylinder. These servomotors usually comprise a cylinder or shell having a front section and a rear section joined together by a twist lock type connection, similar to that shown in U.S. Pat. No. 3,109,346, having a reciprocable piston located therein which supplies an output force. This type of twist lock arrangement extends past the periphery of the shell resulting in additional needed installation space. Attempts have been made to develop a connection between the front and rear shell by the use of interlocking lugs which permit the diameter of the piston to be only negligibly smaller than the shells. In such a servomotor, the diaphragm of the piston has an external marginal portion which is approximately equal to the internal diameter of the front shell. The rear shell engages the marginal portion and presses the same against the internal diameter. However, in manufacturing the shells, eccentricity develops and if the shells are not matched, a vacuum leak can occur. In attempting to compensate for these eccentricities, a greater space between the lugs on the front shell and projections on the rear shell was provided to allow a small amount of radial rotation between these members to uniformly seat the marginal portion. However, with this arrangement, the edge of the marginal portion of the diaphragm is exposed to contaminants which can deteriorate the diaphragm over an extended period of time, again creating a condition where vacuum leak can occur.

In my U.S. Pat. No. 3,768,379, a servomotor is constructed by a disc which encloses an annular front shell by radially confining a bead on a diaphragm against the annular shell while tabs on the annular shell are bent to hold the bead against an annular groove or step to axially seal a front chamber from a rear chamber. However, under some manufacturing conditions it is possible for the disc to cut the bead and produce a potential leak between the front chamber and the rear chamber.

SUMMARY OF THE INVENTION

I have devised a servomotor having a front shell with substantially uniform outside diameter. The outside diameter has an annular groove adjacent an open end of the front shell. A series of aligning slots are located along the open end of the front shell. A series of locking tabs extend from the open end between the aligning slots. A rear shell has a closure disc with a peripheral ledge thereon from which radial lugs extend. A diaphragm attached to a wall has an external bead which follows the contour of the annular front shell from the annular groove to the aligning slots. The lugs are positioned within the aligning slots and the tabs rotated to engage the peripheral ledge which urges the bead of the diaphragm against the front shell to separate an established front chamber from a rear chamber. A control valve is located within the rear shell to present air to the rear chamber and establish a pressure differential which moves the wall and establishes an operational output for the servomotor.

It is therefore the object of this invention to provide a servomotor with a fastener means whereby a peripheral ledge urges a bead of a diaphragm against the contour of a front shell to separate a first chamber from a second chamber.

It is another object of this invention to provide a servomotor with an annular front shell having a groove adjacent an open end from which a series of tabs extend. A disc-shaped rear shell has a pheripheral ledge which engages and holds a bead of the diaphragm against an annular groove on the front shell upon the tabs being brought into engagement with the peripheral ledge.

It is a still further object of this invention to provide a servomotor with a closure means through which a series of locking tabs engage a peripheral ledge for urging a bead against an internally projecting rib of a tubular front shell to sealingly separate a vacuum chamber from an atmospheric chamber upon actuation of a control valve means.

These and other objects will become apparent from reading this specification and viewing the drawings.

BRIEF DESCRIPTION OF THE DRAWINGS

FIG. 1 is a sectional view of a servomotor having a front shell joined to a rear shell by a series of tabs which hold a peripheral ledge against an annular rib on the front shell.

FIG. 2 is a partial end view showing a first closure means for the servomotor of FIG. 1.

FIG. 3 is a partial end view showing a second closure means for the servomotor of FIG. 1.

FIG. 4 is a partial view of a closure means showing a tapered ledge on the rear shell.

DETAILED DESCRIPTION OF THE PREFERRED EMBODIMENT

The fluid pressure servomotor 10 shown in FIG. 1 has a front shell 12 with a closed end 14 from which an annular wall section 16 extends rearwardly. The front shell 12 is joined to a rear shell 18 through a closure means 20 to form a sealed cavity 22. The sealed cavity 22 is divided into a vacuum chamber 24 and a control chamber 26 by wall means 28 and diaphragm means 30. The vacuum chamber 24 is connected to a source of vacuum usually by the intake manifold of a vehicle. The diaphragm means 30 has a rollable section 32 with a bead 34 on the end thereof retained by said closure means 20 and an internal lip 36 which snaps into a groove 38 on hub means 40. The hub means 40 retains valve means 42 in a manner fully described in U.S. Pat. No. 3,106,873 and incorporated herein by reference. The valve means 42 is responsive to an input from push rod 44 to interrupt the communication of vacuum from the front chamber 24 through passage 46 to the rear chamber 26 and allow air under pressure to flow into the rear chamber 26 to create a pressure differential across the wall means 28 and diaphragm means 30. This pressure differential creates a force which acts on the wall means 28 causing the wall means 28 to move by overcoming return spring 48 and supply an output force to push rod 50 which is connected to a master cylinder (not shown) in a braking system. As the wall means 28 moves, rollable section 32 of the diaphragm means 30 rolls itself out or off the forward surface 54 of the wall means 28 to continually change the volume of the control chamber 26.

An annular seat 56, see FIG. 1, is formed by a groove 57 adjacent the end of the front shell 12 a predetermined distance from the opening 58. The bead 34 of the diaphragm means 30 is located on the outside of the seat 56. The diaphragm means 30 is concentric to the annular wall section 16 from the beginning of the groove 57 to the end of the shell 70 and an inside diameter parallel to the tubular portion of the wall section 16.

The rear shell 18 has a first disc section 60 parallel to the closed end 14 and a second disc section 62 which extends past or is along a radial line extending from the annular groove 57. A peripheral ledge 64 attached to the second disc section 62 has closure shoulder 66 from which a series of lugs 68 extend and are located in a corresponding series of aligning slots 70, only one being shown, in front shell 12. The peripheral ledge 64 can either be substantially parallel to the wall 16 as shown in FIG. 1 or have a slight taper as shown in FIG. 4 thereon depending upon the size of bead 34. The bead 34 has a width slightly greater than the distance from the annular groove to the aligning slots 70. The peripheral ledge 64 upon being inserted in the opening 58 will engage the bead 34 and uniformly urge the surfaces against the wall section from the aligning slots past the annular seat 56. Upon the lugs 68 reaching the bottom of the aligning slots, either tabs 72, shown in FIG. 2, or tabs 74 shown in FIG. 3 are bent into contact with the closure shoulder 66 to permanently seal the front chamber 24 and the rear chamber 26 from each other and the atmosphere.

MODE OF OPERATION OF THE PREFERRED EMBODIMENT

During the period of time an automobile with an internal combustion engine is operating, vacuum will be produced at the intake manifold. This vacuum will be communicated through conduit 76 into the front chamber 24 of servomotor 10. From chamber 24 vacuum is communicated through passage 46 into the bore 78 and out passage 80 to the rear chamber 26 to vacuum suspend the wall means 28.

Upon an input force supplied to the push rod 44, the control valve means 42 will engage the vacuum seat 82, the plunger 84 will move away from the poppet 86 to allow air to enter the rear chamber and create a pressure differential across the wall means 28. The pressure differential will cause the wall means 28 to move and supply an output force which will move the push rod 50 to operate the master cylinder in a braking system.

I claim:

1. A servomotor for use in a power braking system comprising:

a front shell having a substantially closed end with a rearwardly extending annular wall section terminating with an open end, said closed end having an axial opening therein, said front shell having an inwardly projecting annular groove adjacent said open end, said front shell having a series of aligning slots along the open end, said front shell having tabs extending along the periphery of said open end between said aligning slots;

wall means located in the front shell having an external surface concentric to said annular wall section, said wall means being adapted to move within said front shell toward said closed end;

diaphragm means secured to said wall means having a rollable portion located between said external surface and the interior of the annular wall section and a bead on the end thereof concentric to and extending from said annular groove to said slots;

a rear shell having an end plate with a peripheral ledge substantially equal in width to the distance between the annular groove and the aligning slots in the annular wall, said peripheral ledge having a first section and a second section, said first section having a taper thereon with respect to said annular wall, said second section extending from said first section substantially parallel to said end plate, said second section having a series of lugs thereon for engagement with the aligning slots, said first section and said second section engaging said bead on the diaphragm means to radially compress the bead against said annular groove on said annular wall to establish a first chamber between the front shell and the diaphragm means and a second chamber between the diaphragm means and the rear shell upon said tabs on the annular shell being brought into engagement with said second section when said end plate is in substantially a radial line with said annular groove, said taper on said first section urging said bead toward said annular groove to create a sealing force, said sealing force being broken down into a radial component and an axial component to simultaneously urge the bead to resiliently flow against the annular wall and the annular groove to create an air tight seal, said first and second chambers being connected to a source of vacuum;

spring means located in the first chamber for urging the wall means into contact with said rear shell; and control means responsive to an operator for interrupting the communication of vacuum to said second chamber and allowing air under pressure to enter therein to establish a pressure differential across the wall means, said pressure differential causing said wall means to move and transmit an output force through an output rod located in the axial opening in the front shell.

* * * * *